United States Patent [19]

Cameron

[11] Patent Number: 4,775,008
[45] Date of Patent: Oct. 4, 1988

[54] ADJUSTABLE CEMENT HEAD MANIFOLD

[75] Inventor: Donald C. Cameron, Tulsa, Okla.

[73] Assignee: Dowell Schlumberger Incorporated, Tulsa, Okla.

[21] Appl. No.: 159,452

[22] Filed: Feb. 18, 1988

Related U.S. Application Data

[63] Continuation of Ser. No. 000,487, Jan. 6, 1987, abandoned.

[51] Int. Cl.⁴ .................. E21B 33/05; F16L 19/02
[52] U.S. Cl. ........................ 166/70; 166/76; 166/85; 166/153; 285/165; 285/302; 285/354; 285/388; 285/415
[58] Field of Search .................. 166/70, 75.1, 76, 85, 166/90, 153, 242, 285, 291; 285/414, 415, 362, 165, 157, 302, 354, 388, 137.1, 387, 386

[56] References Cited

U.S. PATENT DOCUMENTS

| | | | |
|---|---|---|---|
| 1,016,620 | 2/1912 | Gapp | 285/388 |
| 1,675,808 | 2/1927 | Kliss | 285/332 X |
| 1,791,874 | 2/1931 | Rodgers | 166/70 |
| 2,194,973 | 3/1940 | Durant | 285/354 X |
| 2,438,107 | 3/1948 | Babbitt | 285/388 |
| 3,113,792 | 12/1963 | Brown | 285/354 |
| 3,414,299 | 12/1968 | Roe | 285/234 |
| 4,066,281 | 1/1978 | De Bonis | 285/31 |
| 4,219,226 | 8/1980 | Kappenhagen | 285/354 |
| 4,246,967 | 1/1981 | Harris | 166/75.1 |

OTHER PUBLICATIONS

"Cement Fundamentals" by Dowell.
"Lesson 8: Introduction to Cementing", Aug. 1981.

Primary Examiner—Hoang C. Dang
Attorney, Agent, or Firm—S. A. Littlefield; D. B. Deioma

[57] ABSTRACT

An adjustable cement head manifold connector including a first union having a passageway therethrough operably connected for a fluidtight connection with a cement head, a second union having a passageway therethrough having an end for operably connecting it in a fluidtight manner to a cement head, components for slidably connecting the first union and the second union in a fluidtight manner. The components for slidably connecting including a mandrel having one end fixed to one of the unions and slidably engaged with the other. The fixed end of the mandrel is preferably held with a combination of a sleeve surrounding the mandrel acting in conjunction with a nut which operatively engages and presses the mandrel against the seat at the opening of the union. The end of the mandrel which is slidably engaged utilizes a sleeve nut and O-ring arrnagement for fluidtight engagement against the mandrel. Alternately, a turn-buckle sleeve may be utilized with left and right hand threads connecting to the unions to provide additional reinforcement. One end of the union has a foreshortened end which is made possible by the use of a segmented retainer sleeve held in place by a snap ring and motivated by a flange nut which engages the retainer ring.

22 Claims, 5 Drawing Sheets

ADJUSTABLE CEMENT HEAD MANIFOLD

This is a continuation of application Ser. No. 000,487, filed on Jan. 6, 1987, now abandoned.

BACKGROUND OF THE INVENTION

This invention relates to an adjustable cement head manifold connector and subcombinations thereof. It is particularly useful in the environment in placing a cement casing in a drilled oil well. The general technique of placing a casing in a well is set forth in a brochure of the Dowell Division of Dow Chemical Company entitled "Cementing Fundamentals," the contents of which are incorporated herein by reference.

After a well is drilled, it is usually full of drilling mud. Special equipment is used to displace some of the drilling mud and pump cement down the casing and into the surrounding annulus of the well. The amount of cement used and the pressures encountered are at least partially determined by the volume and depth of the well, and often reach 10,000 pounds per square inch. The cement head, which is connected to a large pump, has a manifold leading to it. The manifold connects to at least two openings, and sometimes more, in the cement head. The cement head has the purpose of holding a wiper plug which is designed to be run inside the casing ahead of or behind the cement slurry. These plugs help prevent contamination between the cement and the drilling fluids as they move down inside the pipe. The plugs also help remove drilling mud that adheres to the inside of the casing.

The cement head provides a connection between a cement pump and the well. The cement pump pumps cement through the manifold into the head. There are usually at least two valves for diverting the pumped fluid either below the plugs in the cementing head or above them when it is desired to push them down the casing. The cementing head has a cap that can be removed for inserting the cement plugs.

During a cementing job a bottom wiper plug is placed in the cementing head and held in place by a wiper plug retainer. Drilling fluid is pumped through the bottom valve until the fluid has been circulated from the surface down the casing and up the annulus back to the surface. The wiper plug retainer valve is then opened and the cement slurry is pumped through the top valve. The cement slurry pushes the bottom wiper plug down inside the casing.

After all the slurry has been displaced, the pumping is stopped and a top wiper plug is placed in the cementing head. Then drilling fluid or water is pumped through the top valve, which forces the top wiper plug down inside the casing. Pumping is continued until the top wiper plug seats on the top of the float collar. The well is then shut in until the cement has had time to set.

Because of the harsh environment encountered during the cementing of an oil well, the manifold must be very sturdy, have a well-engineered design, and be leakproof. Moreover, because the inlet and outlets of cement heads vary somewhat in their spacings, many different manifolds have to be utilized. Because of the many different spacings of inlets, sometimes the wrong manifold is forced into place. Accordingly, leaks occur which could cause damaging results to people and equipment.

It is the desire of this invention to provide a safe manifold which can be utilized with many different cement heads in a quick, efficient, and safe manner. By utilizing a variable length of the connection between the two unions, this result has been accomplished.

Another problem with the manifolds presently used for cementing wells is that the relatively long horizontal piece from the cement head to the inlet pipe causes an excessive amount of torque, which results in cracks and breaks. Accordingly, it is highly desirable to minimize the horizontal distance from the line bringing in the cement to the cement heads. In almost all conditions, a valve has to be placed between the line and the head so that, as mentioned above, the flow can be diverted. In the past, a number of nipples and retainer rings and nuts have been utilized, but not in a satisfactory manner. Often, the manifold has had to be suspended in different ways in order to relieve some of the forces on it to prevent cracking.

One of the results of this invention has been to design a connecting means which has considerably foreshortened the horizontal distance from the cement head to the inlet line, and thus reduce the torque arm which causes damage to the manifold valve or cement head.

The result of this invention is to provide an adjustable manifold which is safer to use because of its shorter connection to the cement head and which is easily tightened in place in a fluidtight manner for many different spacings of connectors on the cement heads.

DETAILED DESCRIPTION OF THE DRAWINGS

Figure 1:
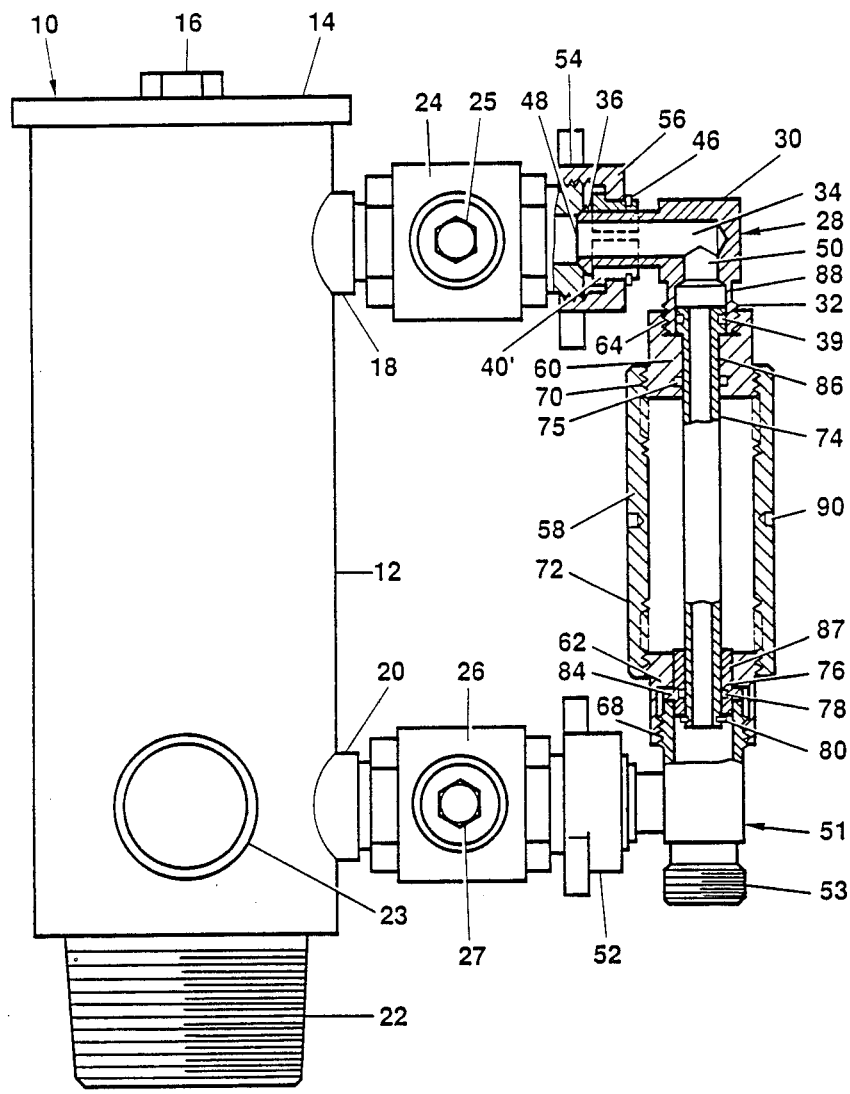
FIG. 1 illustrates a side elevation of the adjustable cement head manifold of this invention.
Figure 2:
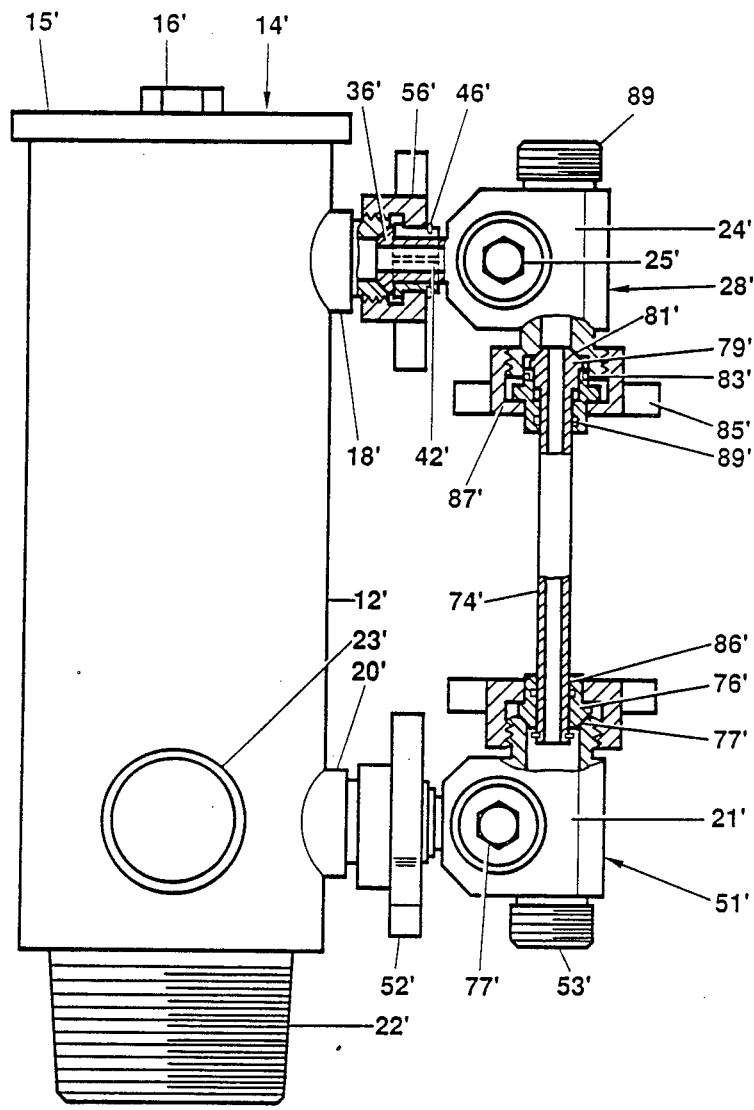
FIG. 2 is a side elevation of a second embodiment of the adjustable cement head manifold connector of this invention.
Figure 3:
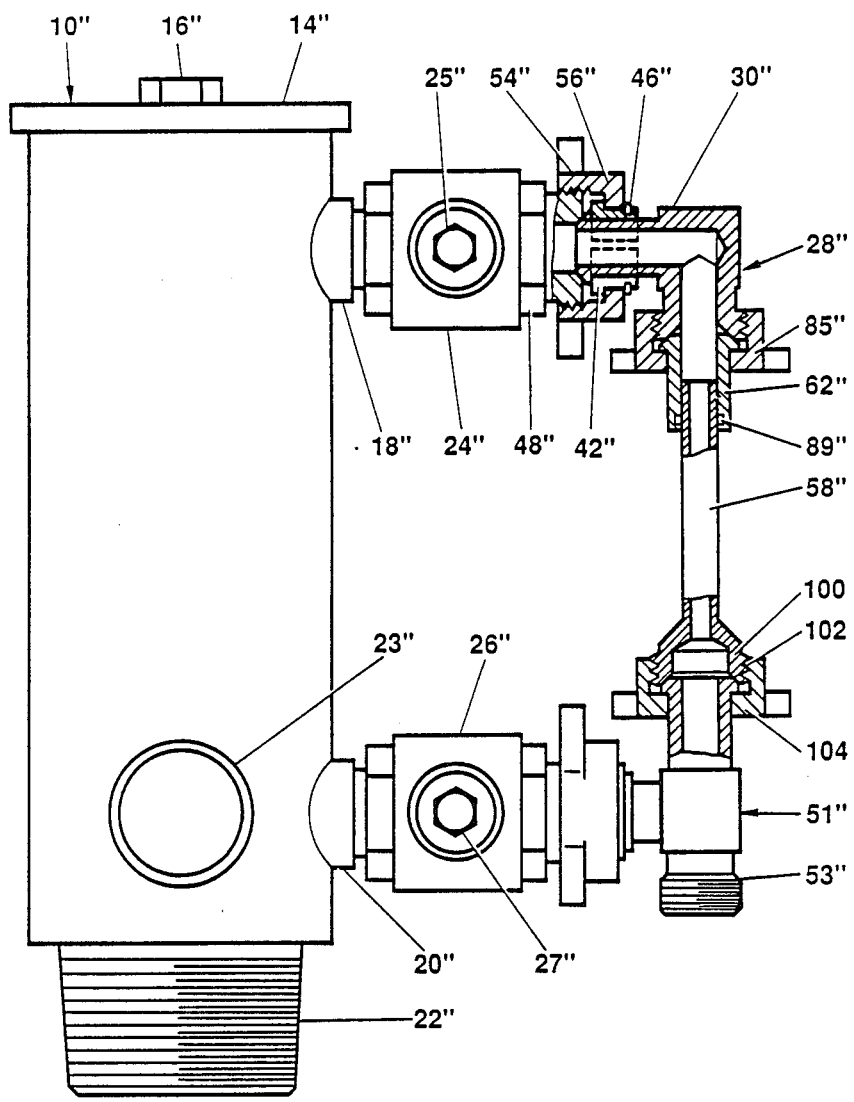
FIG. 3 illustrates a side elevation of a third embodiment of the adjustable cement head manifold.

As illustrated in FIGS. 1 through 3, this invention relates to an adjustable cement head manifold connected to the cement head. Because of the similarity of many of the parts, primes and double primes will be utilized where the parts are similar.

The cement head 10, 10', and 10" includes a cylindrical body 12, 12', and 12" having a removable top 14, 14', and 14" having a holding device 16, 16', and 16". The cement head has at least two inlets 18 and 20 which connect to the manifold 11, 11', 11" and 111'" and valves. The outlet 22, 22', and 22" engages the well head. A plug 23, 23', and 23" provides access to the head if necessary.

Valves 24, 24', 24" and 26, 26', 26" with wrench pads 25, 25', 25" and 27, 27', 27", respectively, to open and close the valves, are provided either after the manifold or as part of it. The valves are standard types presently commercially available.

Figure 4:
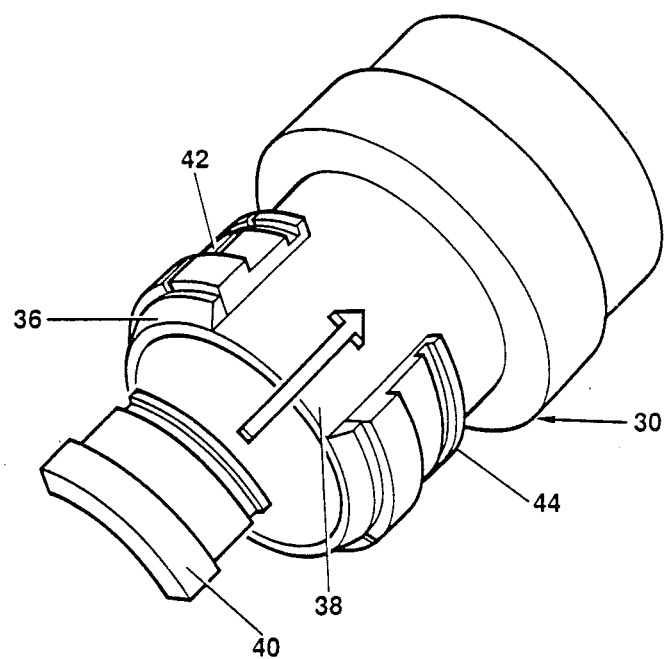
FIG. 4 is a perspective view of the segmented retainer ring utilized in the present invention.
Figure 5:
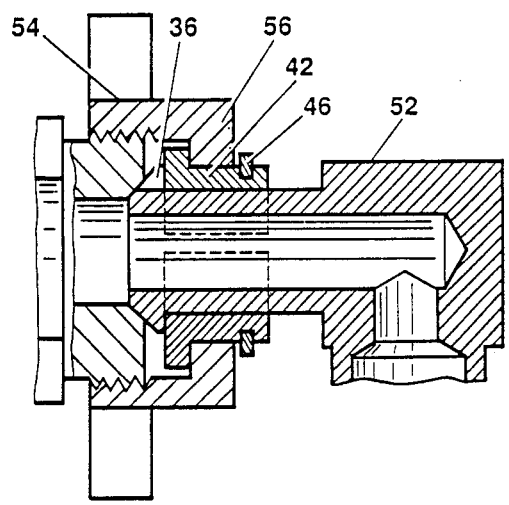
FIG. 5 is an elevation view, partly cut away, of the segmented retainer ring of the present invention.

As particularly illustrated in FIGS. 1, 4, and 5, the first union 28 has a first end 30 and a second end 32. A passageway 34 allows fluid to pass through the first union. The first end 30 of the first union 28 has an annular flange 36, as particularly noted in FIG. 4. An interruption 38 provides an opening through which segments 40 of a retainer ring 42 may pass. The interruption 38 must be wide enough for the segments 40 to pass therethrough. An annular groove 44 provides a holding means for a snap ring 46. Because the interruption 38 allows the segments 40 to pass therethrough, it is possible to make the end 30 much shorter than the prior art. The number of segments 40 may vary from three upwardly, but three rings of 120 degrees and six rings of 60 degrees each have been used successfully.

In particular, in the embodiment of this invention, the distance from the first end 48 to the center of the passageway 50 is about 8¼ inches. Previously, the same dimension was 17½ inches. Accordingly, there has been more than a fifty percent reduction in the length of the first end. As basic physics establishes, the force on the fitting times the lever arm is the torque that has to be sustained by the fittings. This reduction in arm length is a major improvement, resulting in increased life and reduction in problems with cement head manifolds.

A nut 54 has a radially inwardly projecting flange 56 which acts to engage the flange 36, thus driving the end 48 of the fitting against the inlet of the valve 24. Although not shown in detail, a similar second union 51 has a first end 52. An inlet connector 53 provides access to the passageway in the second union 51.

FIG. 1 illustrates an embodiment of this invention which is used for the highest pressures usually encountered in well casing placements. It has been tested in excess of 15,000 psi. Added strength has been provided by a turnbuckle sleeve 58, with right and left-hand threads, which interacts with complementary threads on nuts 60 and 62. The nuts 60 and 62 have internal threads 64 and 68, respectively, and external threads 70 and 72, which act in a manner to separate or bring together the first and second unions.

A mandrel 74 has one end 76 slidably attached to the second union 51. Appropriate O-rings 78 and snap rings 80 are utilized to seal it and hold it in place. A sleeve 82 surrounds the mandrel 74 and has a flange 84 which engages the nut 62. The other end 86 of the mandrel has an O-ring 88 in a groove 89 to hold it in fluidtight communication with the second end 32 of the fitting of the first union 28. An O-ring 75 is used to seal the nut 60 with the mandrel 74. Holes 90 in the turnbuckle sleeve allow a tool to be used to rotate the sleeve 58.

FIG. 2 is similar in nature to FIG. 1, but is used at slightly lower pressures. Accordingly, it does not need the additional turnbuckle sleeve. It does utilize, however, a mandrel 74' having one end 86' slidably engaged with a sleeve 76' which is held in fluidtight engagement with the second end of the second union 77'. The other end of the mandrel similarly has a sleeve 79' which is forced against the seat 81' of a second end of the first union. An O-ring is provided at 83 in the sleeve to provide a fluidtight connection. A nut 85' has a flange 87' which abuts against the flange on the sleeve and holds the sleeve 79 in engagement with the union. In this embodiment, the valves 24' and 26' are included as part of the first union 28' and 51'.

A male threaded extension 89 is available on this embodiment, and may be placed on the others, of course, to act as a support connector for holding the manifold in position.

It should be noted that the distance that the unions may be separated will vary according to the size of the sleeves utilized, as well as the length of the connectors.

FIG. 3 illustrates a third embodiment of this invention, and again similar parts have been similarly numbered using double primes. The difference in this embodiment is in the design of the mandrel. In this instance, the slidable engagement of the mandrel 58" is with the sleeve 62". The sleeve 62" is held in place by the nut 85" by use of its complementary flanges. An O'ring 89" is utilized to keep a fluidtight connection. In this instance, the end of the mandrel has a male thread 100 which connects with a female thread 102 on a nut 104 to hold the end fixedly engaged with the second union 51".

Figure 6:
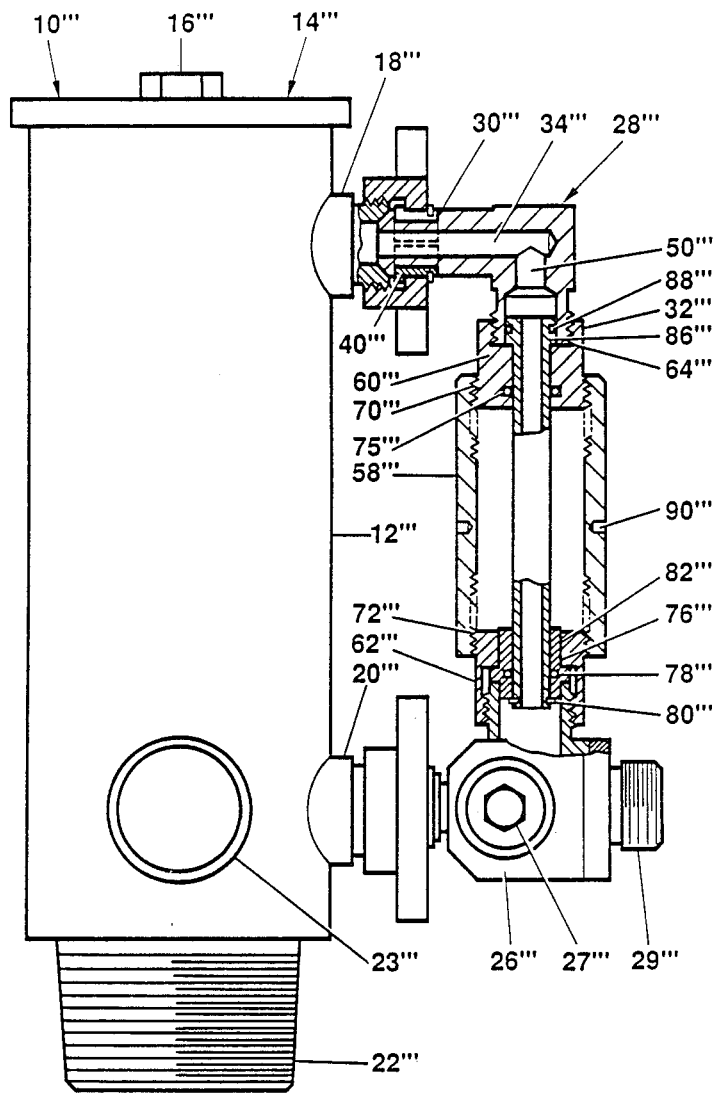
FIG. 6 is a side elevation of another embodiment of the adjustable cement head manifold.

Another alternate embodiment of the invention is illustrated in FIG. 6. This embodiment has similar numbers to the other embodiments for similar parts, but utilizes triple primes to indicate the corresponding parts. The basic difference in FIG. 6 from the other embodiments is the use of a three-way solenoid valve 26'''. A threaded male member 27''' connects to the solenoid valve. Since three-way solenoid valves are well known in the art, specifics of this particular one are not shown. In particular, however, the influx of cement can go either into the upper passage only, the lower passage only, or both simultaneously. Moreover, the top connection 28 may be a "T" instead of the "L" connection in order to provide a means to connect thereto.

Accordingly, a cement pump may be connected to a great variety of cement heads with the use of this invention instead of the use of different manifolds. Moreover, by utilizing different sizes of sleeves, etc., cement heads from 3 inches to 18¼ inches can be connected with a manifold of this type. Each of the illustrated devices has a wide range of uses.

Accordingly, this invention has solved the traditional problem of having many different manifolds that have to be utilized for different cement head dimensional inlets. Moreover, this solution has provided a manifold which is easy to use, safe, and functionally designed for its intended purpose.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. Accordingly, the patent is not to be limited in scope and effect to the specific embodiments herein shown and described nor in any other way that is inconsistent with the extent to which the progress in the art has been advanced by the invention.

What is claimed:

1. An adjustable cement head manifold and a cement head having an outlet and at least two inlets therein and a first and second connecting means at the inlets, the manifold comprising:

a first union on the manifold having a passage therethrough operatively connected in a fluidtight manner to one of the inlets of the cement head;

a second union on the manifold having a passage therethrough operatively connected to the other inlet of the cement head; and means for slidably connecting the first union and the second union in a fluidtight manner so that spacing of the first union from the second union may be varied without substantial leakage of a fluid passing therethrough, the means for slidably connecting the first union and the second union including a mandrel having a passage therethrough in fluid contact with the unions; and one end of the mandrel being slidably operatively attached to at least one of the unions in a fluidtight fashion so that the unions may be operatively attached to inlets having different spacings.

2. The adjustable cement head manifold of claim 1, wherein there are valves operatively attached to the inlets.

3. The adjustable cement head manifold of claim 2, wherein the other end of the mandrel is operatively attached to the other union in a fluidtight fixed manner.

4. The adjustable cement head manifold of claim 3, wherein the first union is operatively attached to said one inlet of the cement head by a shortened first means for attaching;

the first means for attaching including a segmented retaining ring adapted to fit around a first end of the first union and a first nut adapted to engage and move the retaining ring to aid in holding the first union in a fluidtight connection with said one inlet of the cement head.

5. The adjustable cement head manifold of claim 4, wherein the first end of the first union has an interrupted flange adapted to permit segments of the retaining ring to be placed thereon, rotated, and supported by the flange without removing the first nut from the first end, thus allowing the first end of the first union to be foreshortened.

6. The adjustable cement head manifold of claim 5, wherein the first nut has a radially inwardly directed flange which is adapted to engage a flange on the retainer ring;

the first means for attaching further including a snap ring to hold the segments of the retaining ring in position and to engage the flange on the nut whereby movement of the nut moves the retainer ring and the first end of the first union into and out of engagement with said one inlet.

7. The adjustable cement head manifold of claim 5, wherein the second union has a second means for attaching the second union to said other inlet of the cement head substantially the same as the first means for attaching.

8. The adjustable cement head manifold of claim 1, wherein valves are operatively attached to each of the unions whereby cement may be regulated in its passage through the manifold and into the cement head.

9. The adjustable cement head manifold of claim 8, wherein a sleeve acting with a nut on the first union holds one end of the mandrel in fluidtight fixed relation with the first union.

10. The adjustable cement head manifold of claim 9, wherein another end of the mandrel has a snap ring around its circumference, a second sleeve about the mandrel, and a nut which moves the second sleeve and mandrel into engagement with the second union.

11. The adjustable cement head manifold of claim 10, wherein the nut is a turnbuckle sleeve having oppositely directed threads at either end to thereby move the unions toward or away from each other operatively attached to and supporting the first and second unions.

12. The adjustable cement head manifold of claim 5, wherein the first union is slidably engaged with the mandrel by means of a sleeve around the mandrel and the second union is fixedly engaged with the mandrel by means of a nut which threadedly engages the mandrel.

13. A fitting adapted for connection to two spaced connecting means comprising:

a first union having a passageway therethrough;

a first end of the first union having a threaded means operatively attached thereto for fluidtight connection with one of said spaced connecting means, the first end of the first union having an annular flange and an interruption in the annular flange, a longitudinally segmented retaining ring surrounding the first end of the first union and engaging the annular flange at one end and the threaded means at the other end, each segment of the retaining ring having a smaller circumference than the interruption in the annular flange so that each segment of the retaining ring may pass through the interruption of the annular flange, be rotated and held in place on the first end of the first union;

a second end of the first union, the second end having means thereon for operatively connecting it to a mandrel;

a second union having a passageway therethrough;

a first end on the second union having a threaded means for connecting the first end of the second union in fluidtight connection with the other of said spaced connecting means;

a second means on the other end of the second union for operatively attaching it to the mandrel; and a mandrel operatively connected between the first union and the second union.

14. The fitting of claim 13, wherein one end of the mandrel is slidably operatively engaged in a fluidtight manner with one of the unions and the other end is fixedly engaged with the other union so that the unions may be connected to connecting means which are spaced at different dimensions.

15. The fitting of claim 14, wherein said one end of the mandrel is operably engaged with a sleeve through which it passes in a fluidtight manner, the sleeve in turn being operatively connected to one of the unions by means of a connector which operably engages the sleeve with the union, and said other end of the mandrel is fixedly engaged with said other union by use of a sleeve slidably mounted on the mandrel and a nut which engages the sleeve and the other union to hold said other end of the mandrel on the other union.

16. The fitting of claim 15, wherein a flange on the sleeve is engaged by the nut and moved toward engagement with the other union in order that a fluidtight passageway is complete through the first union, the mandrel and the second union.

17. The fitting of claim 16, wherein a snap ring is mounted in an annular groove in the retainer ring.

18. The fitting of claim 17, wherein the threaded means of the first union is in the form of a nut having a flange thereon and engaging a flange on the retaining ring to move the first union into fluidtight connection with said one of said spaced connecting means.

19. The fitting of claim 18, wherein the nut has a female thread for threadedly engaging a male portion of said one connecting means and a radially directed flange positioned between the flange and the snap ring on the segmented retaining ring.

20. The fitting of claim 13, wherein there is a valve operatively connected to each of the unions to govern the flow of fluid through the fitting.

21. The fitting of claim 20, wherein each of the unions including the valves forms an "L" shape and has one part thereof operatively connected to one of the spaced connecting means and the other part to the mandrel.

22. The adjustable fitting of claim 13, wherein there is a four-way solenoid valve operatively attached to one of the unions.

* * * * *